United States Patent

[11] 3,633,734

[72] Inventor Robert E. Conners
Mehlville, Mo.
[21] Appl. No. 12,923
[22] Filed Feb. 20, 1970
[45] Patented Jan. 11, 1972
[73] Assignee Sunline, Inc.
St. Louis, Mo.

[54] CONVEYOR SYSTEM
15 Claims, 11 Drawing Figs.

[52] U.S. Cl. .................................................. 198/78,
198/20, 214/11 R
[51] Int. Cl. ....................................................... B65g 37/00
[50] Field of Search .......................................... 198/19, 20,
34, 38, 76, 78, 80, 105; 214/16 B, 11; 271/74,
DIG. 4

[56] References Cited
UNITED STATES PATENTS
2,497,874 2/1950 Evans et al. ................... 198/78 X Primary Examiner—Richard E. Aegerter
Assistant Examiner—Alfred N. Goodman
Attorney—Ralph W. Kalish ABSTRACT: A conveyor system for discrete articles comprising an infeed conveyor for receiving articles from a supply source in random fashion, a crossfeed conveyor presented upwardly and forwardly of the discharge end of said infeed conveyor and traveling in a direction axially normal thereto for communicating with an article-handling station, relatively high-speed rollers interposed between said infeed conveyor and said crossfeed conveyor; said infeed conveyor being adapted for rockable movement so that when in raised position, articles may be transferred therefrom onto said high-speed rollers which latter, due to their relatively increased angular velocity causes the received articles to be transferred onto said crossfeed conveyor in aligned relationship for sequential presentation at the particular handling station. The relationship between the linear rates of travel between the infeed conveyor and the crossfeed conveyor and the speed of rotation of the rollers is critical for effecting a facile transfer of the articles within the requisite aligned relationship.

FIG. 1

INVENTOR
ROBERT E. CONNERS
BY *Ralph W. Kalish*
ATTORNEY

INVENTOR
ROBERT E. CONNERS

BY *Ralph W. Kalish*

ATTORNEY

INVENTOR
ROBERT E. CONNERS
BY Ralph N. Kalish
ATTORNEY

CONVEYOR SYSTEM

BACKGROUND AND SUMMARY OF THE INVENTION

This invention relates in general to conveyors and more particularly to a conveyor system adapted for receiving discrete articles in a random pattern and causing same to be transmitted to a selected handling station for sequential presentation in an aligned condition.

It is an object of the present invention to provide a conveyor system adapted for accommodating a high volume of discrete articles, such as candy bars and the like, in minimum time for delivering the same continuously from a source of supply to any or all of multiple, laterally located article handling stations.

It is another objective of the present invention to provide a conveyor system adapted to receive discrete articles in random fashion from a source of supply and having means for delivering same in aligned condition to any or all of multiple, laterally located handling stations.

It is a further object of the present invention to provide a conveyor system which is uniquely adapted for accommodating a high volume of discrete articles permitting of selective distribution of such articles to laterally located handling stations whereby jamming or obstructive flow is prevented.

It is another object of the present invention to provide a conveyor system which is adapted for automatic operation so as to require a minimum of surveillance and which is sturdily constructed so as to be resistant to breakdown.

It is another object of the present invention to provide a conveyor system which is adapted for use with myriad types of articles and products conducing to the accommodation of a volume level not heretofore attained by currently known machines.

It is a still further object of the present invention to provide a conveyor system which may be of any desired extent as the same is composed of composite units which may be readily incorporated as desired.

It is a still further object of the present invention to provide a conveyor system for handling discrete articles which is very durable in use and highly reliable in operation, and economical in manufacture.

DESCRIPTION OF THE PREFERRED EMBODIMENT

Figure 1:
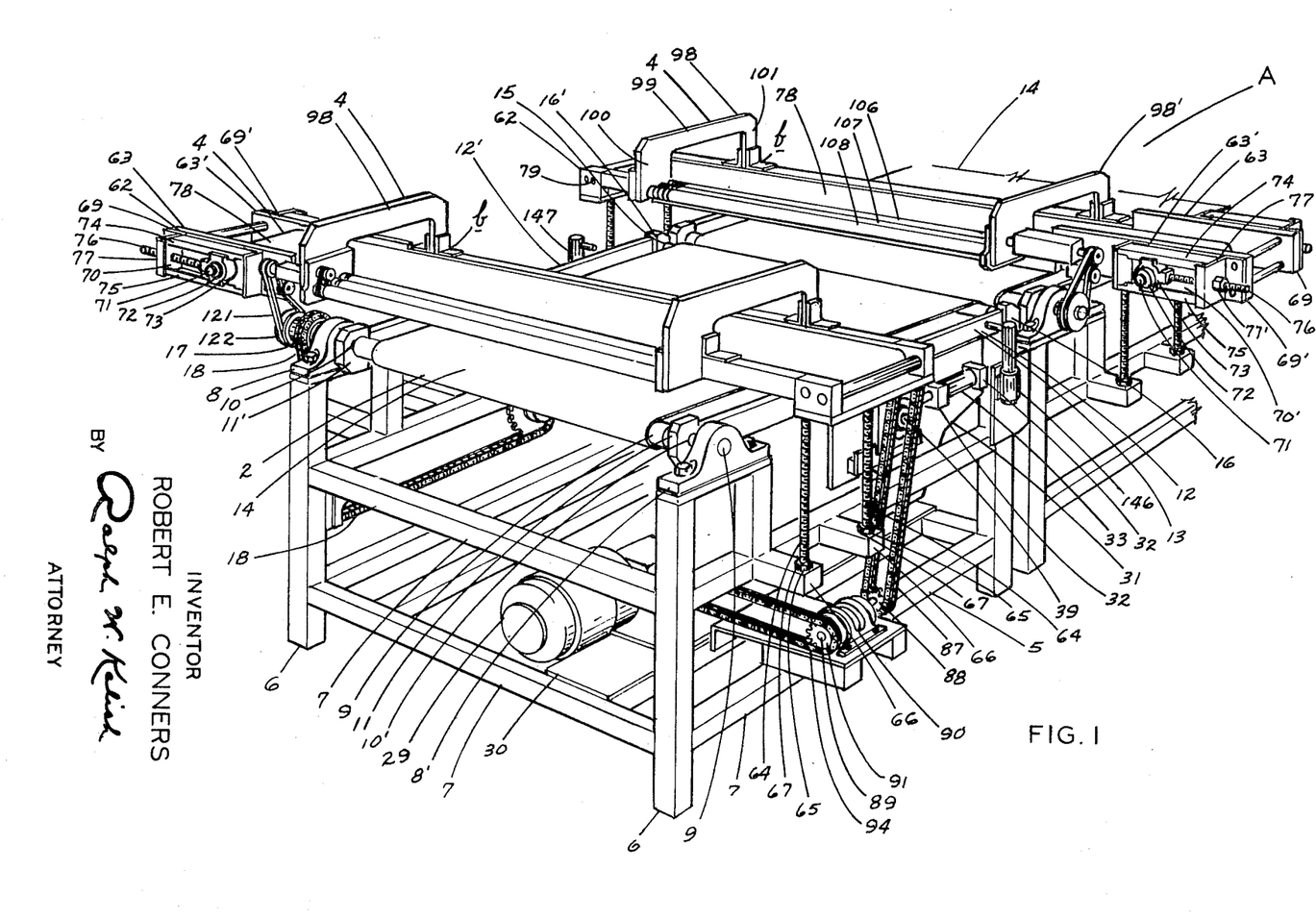
FIG. 1 is a perspective view of a conveyor system constructed in accordance with and embodying the present invention.

Referring now by reference characters to the drawings which illustrate the present invention, A generally designates a conveyor system which incorporates an infeed conveyor 1 having a charging or article-receiving end 2, a discharge end 3; and a crossfeed conveyor 4 provided upwardly and forwardly of the discharge end 3 of the related infeed conveyor 1. It is to be observed that the conveyor system of the present invention, thus, is of unique character, having essentially an infeed conveyor and a crossfeed conveyor so that any overall system may incorporate any predetermined number of such units, as will be more apparent hereinbelow. With a multiplicity of such units, the infeed conveyors 1 will be in end-to-end relationship as illustrated in FIG. 1 and with the rearward-most infeed conveyor being presented adjacent a main conveyor (not shown) which connects the conveyor system of the present invention with the source of articles to be handled. For purposes of description herein, the forward direction will be that toward the right-hand side of FIG. 2 and rearward direction will denote the left-hand side of FIG. 2. It is to be further observed with reference to FIG. 1 that the crossfeed conveyor 4 cooperating with its related infeed conveyor 1 will be presented upwardly of the infeed conveyor of the next adjacent unit.

Conveyor system A is suitably adapted for use with myriad types of articles for conducing to the rapid handling and packing of the same together with alignment of the articles in a file for individual sequential treatment. For purposes of illustration only, system A may be described hereinbelow as used with candy bars, as such system permits of the orderly, aligned position of candy bars for quick wrapping and carton packing or such further handling as may be required.

Infeed conveyor 1 comprises a support frame 5 of general rectangular character, being composed of customary structural components, such as corner legs or uprights 6 and horizontal, base elements 7 which may interconnect adjacent legs for rendering the structure stable. For enhancing the sturdiness of frame 5, the said structural components are preferably of tubular stock having a box cross section. Provided on opposite sides of the charging or rearward end 2 of infeed conveyor 1 is a pair of transversely aligned pillow blocks 8, 8' within which is journaled a transversely extending drive shaft or tail pulley 9, one end of which as indicated at 9' projects laterally outwardly of pillow block 8 for purposes presently appearing. By reason of their configuration, pillow blocks 8, 8' cause drive shaft 9 to be located spacedly forwardly of the extreme rearward end of frame 5 with the intervening spacing being indicated s. Inwardly of, and proximate, each pillow block 8, 8' shaft 9 is received within bearings 10, 10' provided within blocks 11, 11', respectively, fixed to the rearward end of elongated parallel side elements 12, 12', respectively, of a pivot or swing frame, generally designated, 13. Trained about shaft 9 between blocks 11, 11' is one end portion of an endless conveyor belt 14, the opposite or forward end portion of which extends about an idler shaft or head pulley 15 journaled at its ends in bearings (not shown) in blocks 16, 16' fixed on the forward ends of said side elements 12, 12'. Thus, pivot frame 13 comprises shafts 9, 15 and side elements 12, 12' with the intervening blocks 11, 11' and 16, 16' effecting the requisite integration.

Figure 3:
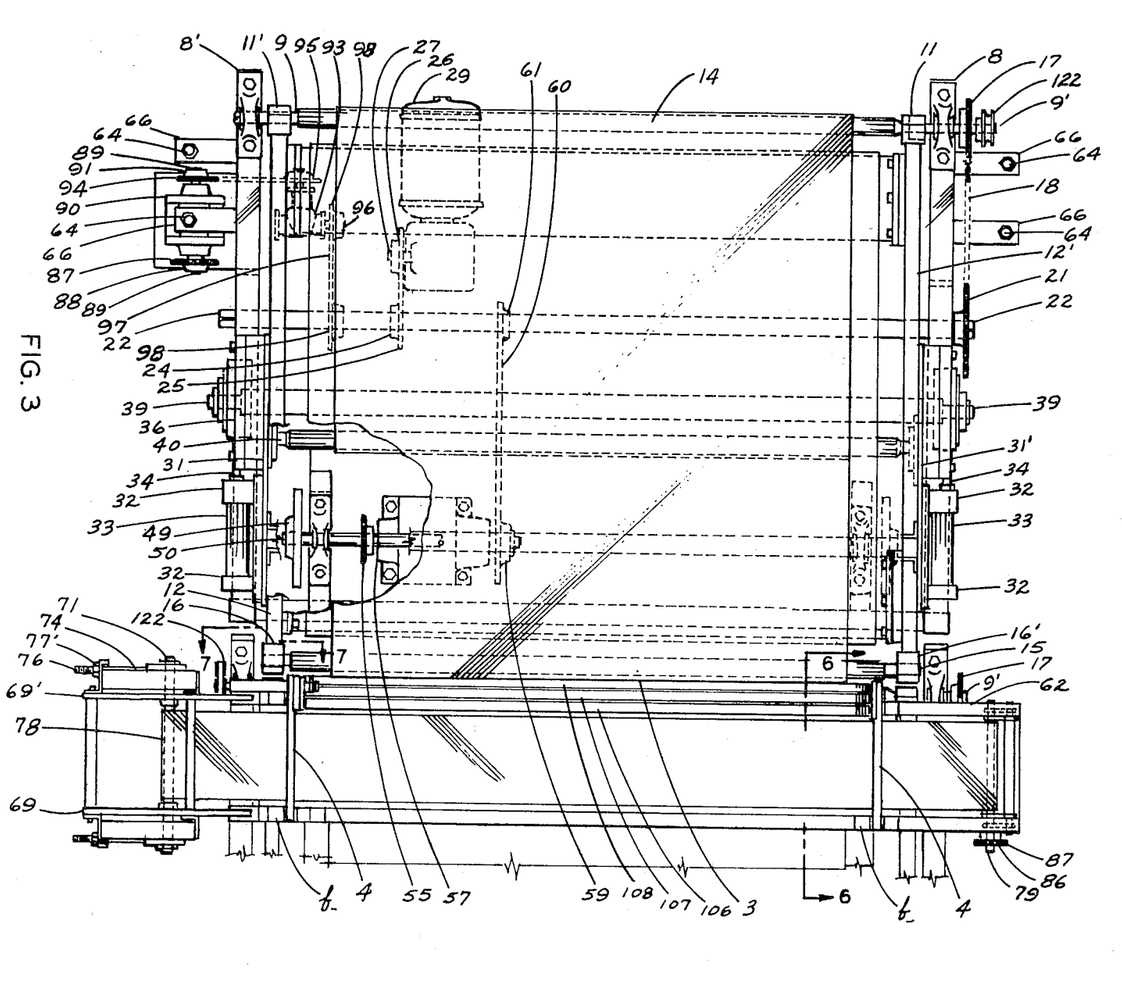
FIG. 3 is a top plan view taken on the line 3—3 of FIG. 2.
Figure 4:
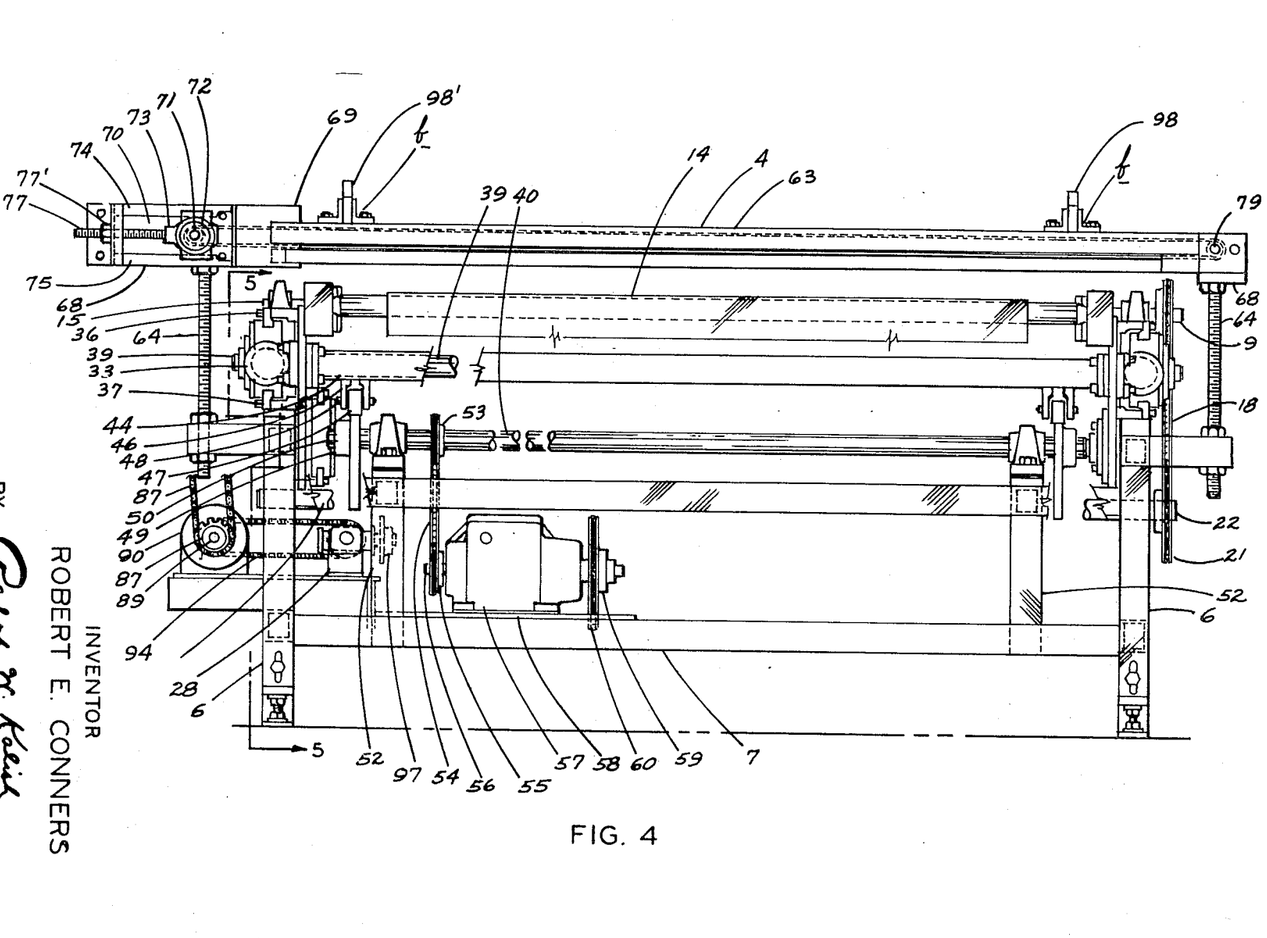
FIG. 4 is an end view taken on the line 4—4 of FIG. 2.
Figure 5:
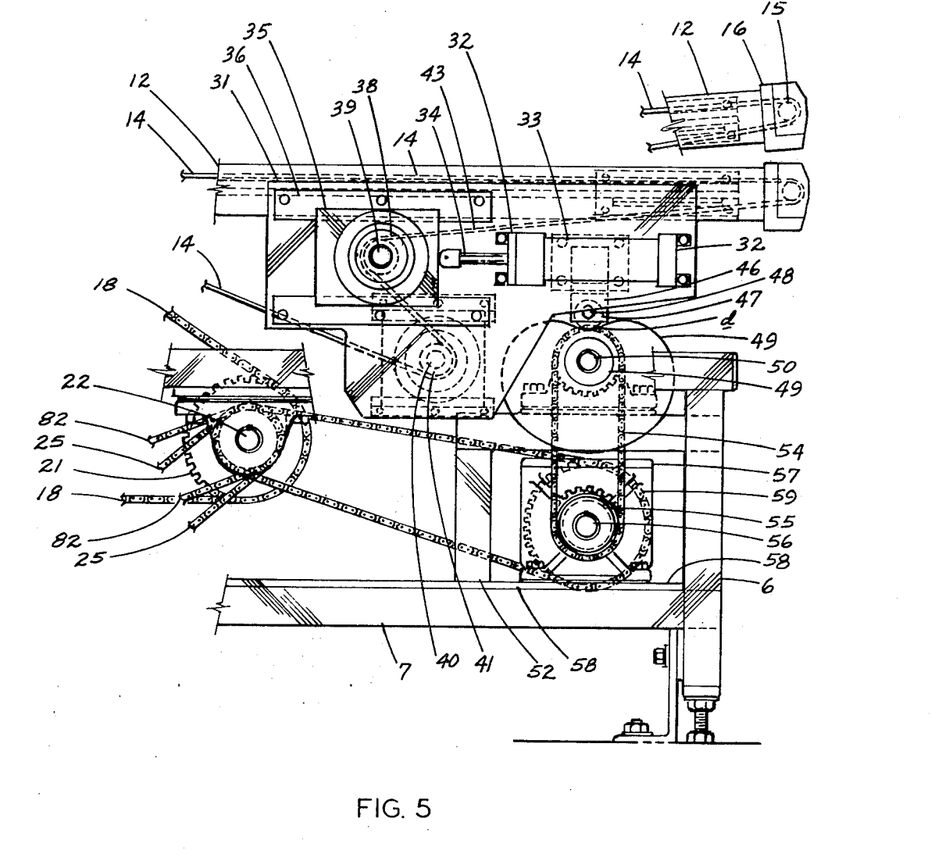
FIG. 5 is an enlarged, fragmentary elevational view taken on the line 5—5 of FIG. 4.
Figure 10:
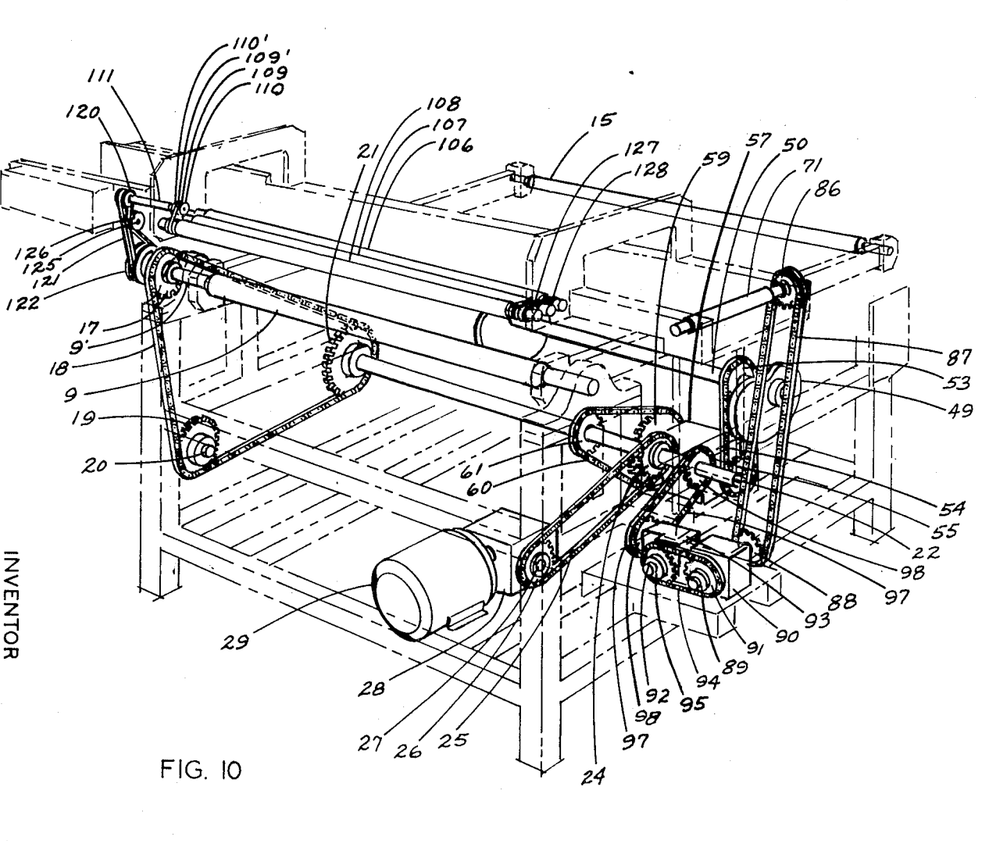
FIG. 10 is a perspective, generally schematic, view illustrating the motion transmission system of the present invention.

Mounted on end 9' of shaft 9 adjacent the laterally outwardly directed face of pillow block 8 is a sprocket wheel 17 which intermeshes with a drive chain 18, one course of which extends vertically for engaging a guide sprocket 19 carried on a stub shaft 20 suitably supported in a bearing (not shown) on frame 5 (FIG. 10). Drive chain 18 also connects sprocket wheel 17 with a drive sprocket 21 splined or otherwise fixed on one end of a main shaft 22 which is axially parallel to shaft 9 being located forwardly and downwardly thereof, beneath conveyor belt 14, with its opposite ends journaled in pillow blocks 23 depending from proximate brace elements 7 of frame 5. Mounted on shaft 22 in its end portion remote from sprocket 21 is a sprocket wheel 24 engaged to a transmission chain 25 which latter also intermeshes with a sprocket 26 secured on the end of the output shaft 27 of a gear reduction unit 28 which latter is operatively connected to a prime mover 29 located upon a mounting platform 30 provided in the lower rearward portion of frame 5 (see FIGS. 3 and 10). Upon energization of prime mover 29 main shaft 22 will be caused to rotate and will, in turn, through drive chain 18, cause rotation to be imparted to shaft 9 for effecting travel of conveyor belt 14 whereby, through friction, rotation of idler shaft 15 is brought about. It is apparent that the rate of linear travel of conveyor belt 14 may be preselected consonant with the particular operation through customary variable speed controls.

Figure 2:
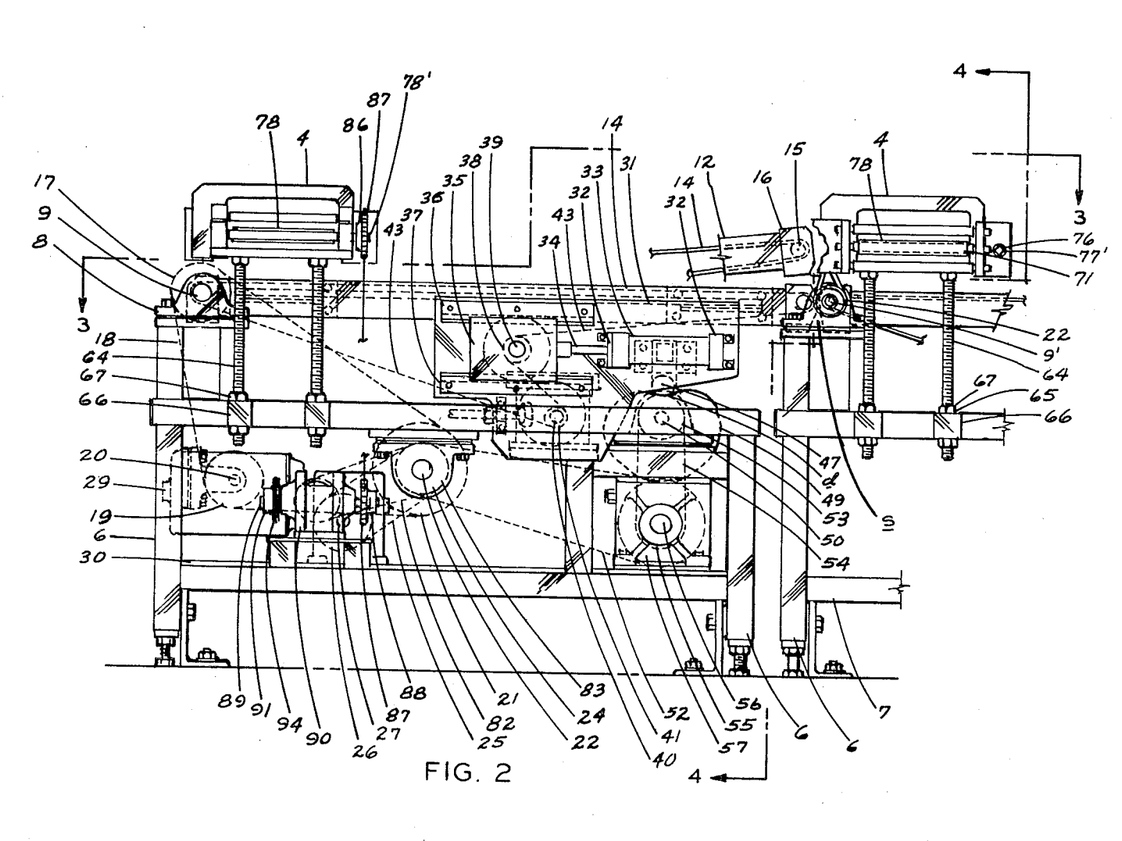
FIG. 2 is a side elevational view of the conveyor system.

Fixed on the outer face of each side element 12, 12' in its end portion near the discharge end 3 of the related infeed conveyor 1 is a plate 31 on which, in its outer face in the forward portion thereof, are mounted spacedly apart brackets 32 for supporting an air cylinder 33 having a rearwardly directed piston 34 engaging a block 35 slidably disposed within vertically aligned, longitudinally extending upper and lower guideways 36, 37 suitably fixed on said plate 31. Each block 35 is provided with a bearing 38 for supporting the ends of a cross shaft 39 which latter, projecting through aligned openings (not shown) in plate 31, extends transversely of frame 35 axially parallel to main shaft 22 but forwardly and upwardly thereof. Accordingly, through requisite operation of air cylinder 33, cross shaft 39 may be positioned longitudinally of frame 5 for conveyor-belt-tensioning purposes to be described below. Also provided on each sideplate 31, downwardly of the forward end portion of the related lower guideway 37 is a bearing 40 for accepting the ends of a guide shaft 41 which, in extending through openings (not shown), sideplates 31 extends transversely of frame 5 in axially parallel relationship to cross shaft 39 but downwardly and forwardly thereof. Referring now particularly to FIG. 2, it will be seen that conveyor belt 14 comprises an upper, article-supporting course 42 and a lower course which extends rearwardly from idler shaft 15, over cross shaft 39 and thence forwardly and downwardly therefrom for engagement about guide shaft 41 from whence said lower course 43 extends upwardly and rearwardly for ultimate disposition about drive shaft 9. Air cylinders 33, slideably disposed cross shaft 39, and guide shaft 41 cooperate to present a readily adjustable means for controlling the tension of conveyor belt 14 with the degree of tension being commensurate with the relative rearward disposition of cross shaft 39.

Figures 7, 9:
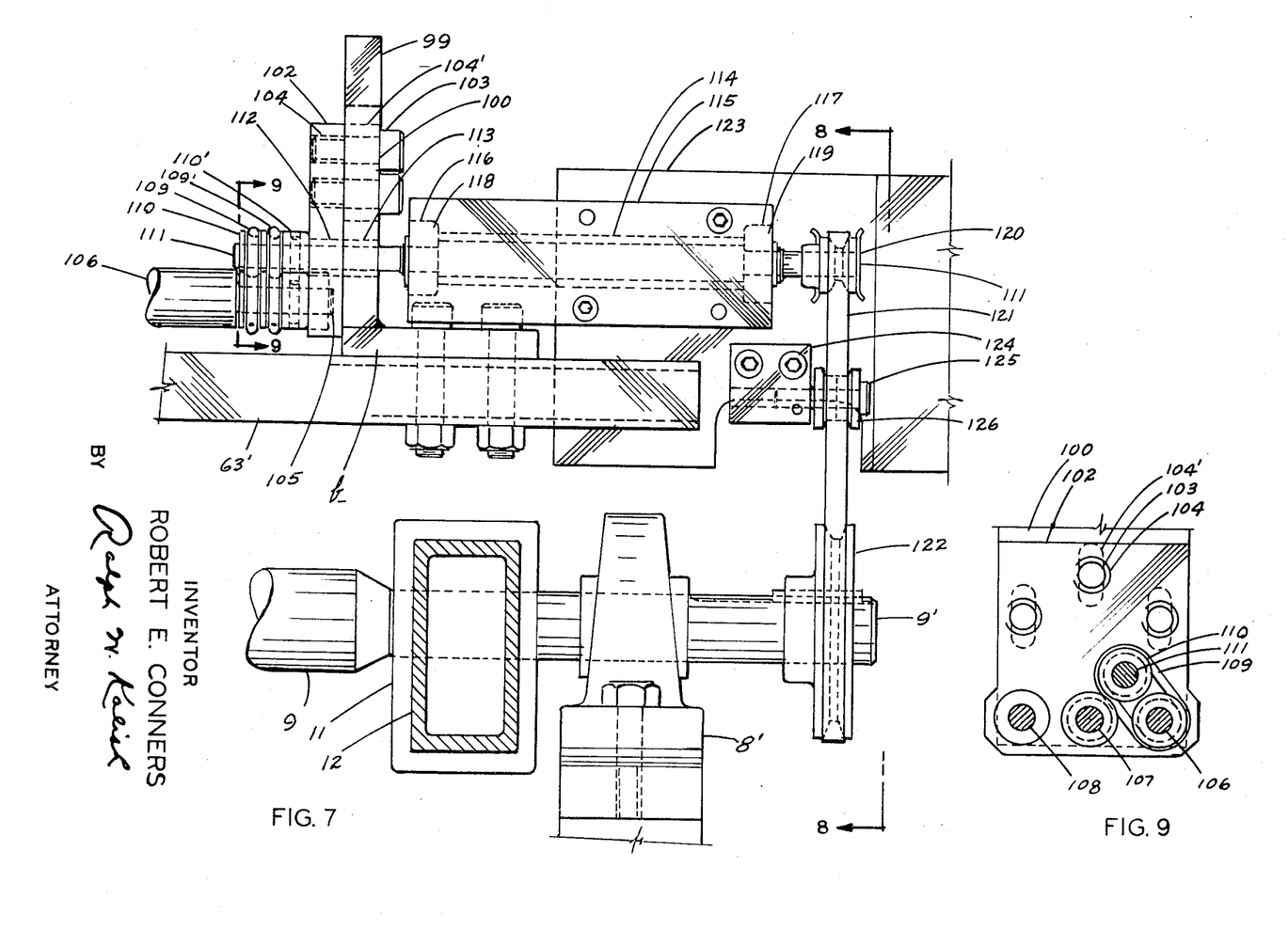
FIG. 7 is an enlarged transverse view, partially in section, taken on the line 7—7 of FIG. 3.
FIG. 9 is a vertical transverse sectional view on the line 9—9 of FIG. 7.
Figure 8:
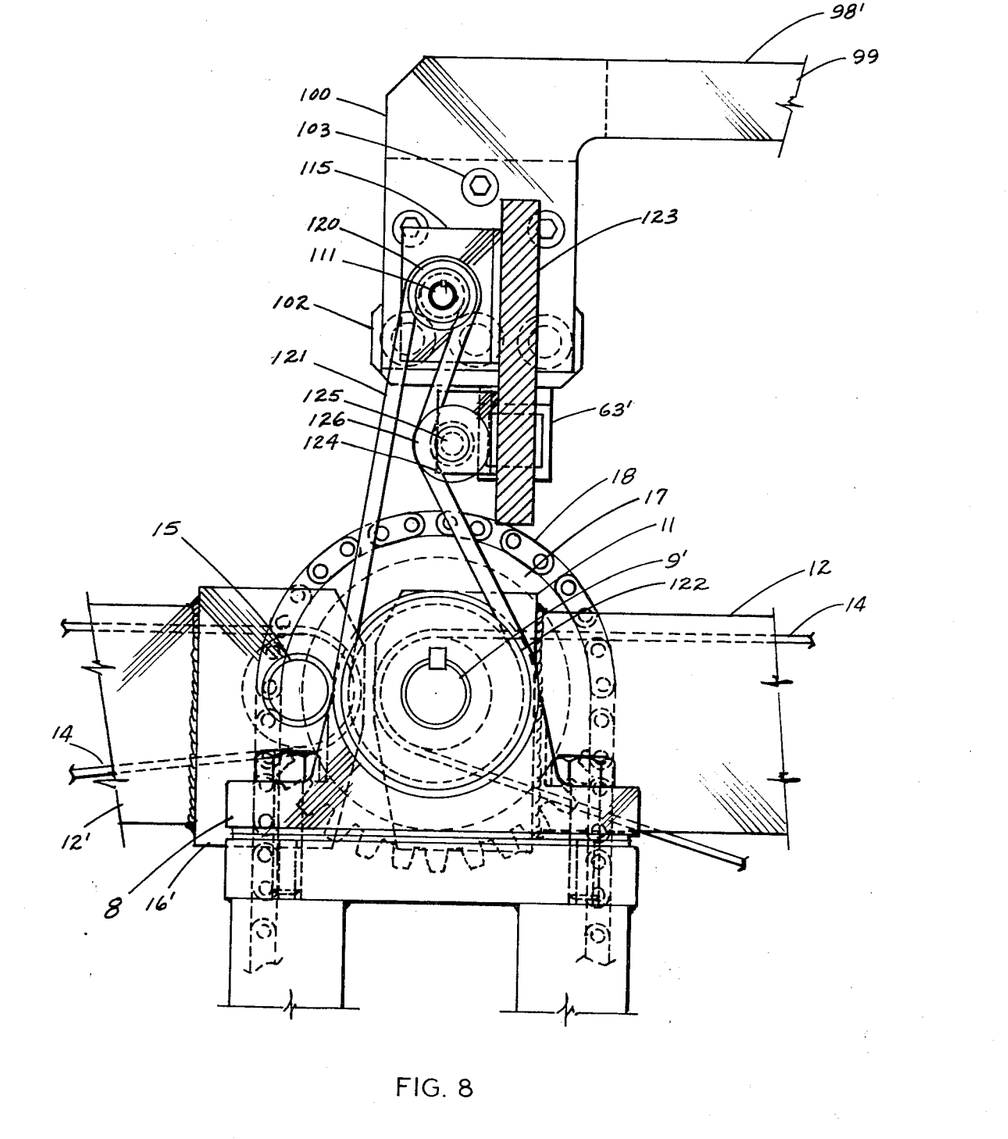
FIG. 8 is a vertical view taken on the line 8—8 of FIG. 7.

Also extending between sideplates 31, in their forward position, is a crossbar 44 suitably fixed at its ends as by bolted mounting flanges indicated at 45. Depending from crossbar 44 immediately inwardly of each plate 31 is a bifurcated mounting 46 for disposition therebetween of a roller-type cam follower 47 carried upon a shaft 48 secured in the opposed portions of said mounting 46. Each cam follower 47 projects downwardly of its related mounting 46 to present its peripheral surface in operating engagement with the edge of a drive cam 49 fixed on the opposite ends of a camshaft 50 for rotation therewith. Each cam 49, being of plate character, is preferably heart-shaped, having the customary depression $d$ so that when the associated cam follower 47 engages the edge of said depression $d$, pivot frame 13 will be in horizontal disposition (see FIG. 2) with the upper course 42 of conveyor belt 14 being substantially planarwise parallel to the support surface. It will be seen that by the interaction of cam follower 47 and cams 49 pivot frame 13 may be rocked upwardly at its discharge end 3 about a pivot axis coaxial of shaft 9. The disposition of pivot frame 13 in upwardly swung position is indicated in phantom lines in FIGS. 2 and 7. In this connection it should be noted that pivot frame 13 is of such extent that the forward end thereof together with blocks 16, 16' and idler shaft 15 will extend into spacing $s$ provided at the charging end 2 of the adjacent infeed conveyor 1 (see FIGS. 2 and 7) so that belts 14 of adjacent infeed conveyors 1 will be surface aligned, almost end-abutting relationship when in article support condition so as to permit transfer of articles from one to the other without disruption or dislocation.

Camshaft 50 extends across frame 5 axially parallel to main shaft 22 and is journaled in pillow blocks 51 mounted upon subframe elements 52 at opposite sides of side frame 5; said cams 49 being disposed on laterally projecting ends of said shaft 50. Carried also upon camshaft 50 inwardly of one pillow block 51 is a sprocket 53 about which is engaged the upper end portion of a transmission chain 54 which intermeshes with a sprocket 55 fixed on the adjacent end of a shaft 56 of a single revolution clutch 57 secured upon a plate 58 supported by frame 5. Said clutch shaft 56 at its other or opposite end mounts a sprocket 59 which is operatively connected to main shaft 22 by a chain 60 engaging a sprocket 61 affixed on shaft 22. Thus, camshaft 50 is rotatable consequent to energization of prime mover 29, subject to clutching action.

In view of the foregoing, it will be seen that upon revolution of camshaft 50 the pivot frame 13 will be rocked about shaft 9 through relative movement of plate cams 49 with respect to the related cam followers 47. The period of elevation of pivot frame 13 is determined by the speed of rotation of clutch shaft 56 since upon completion of a single revolution the clutch will disengage with the cam followers 47 being restored to disposition within the associated depressions $d$.

Figure 6:
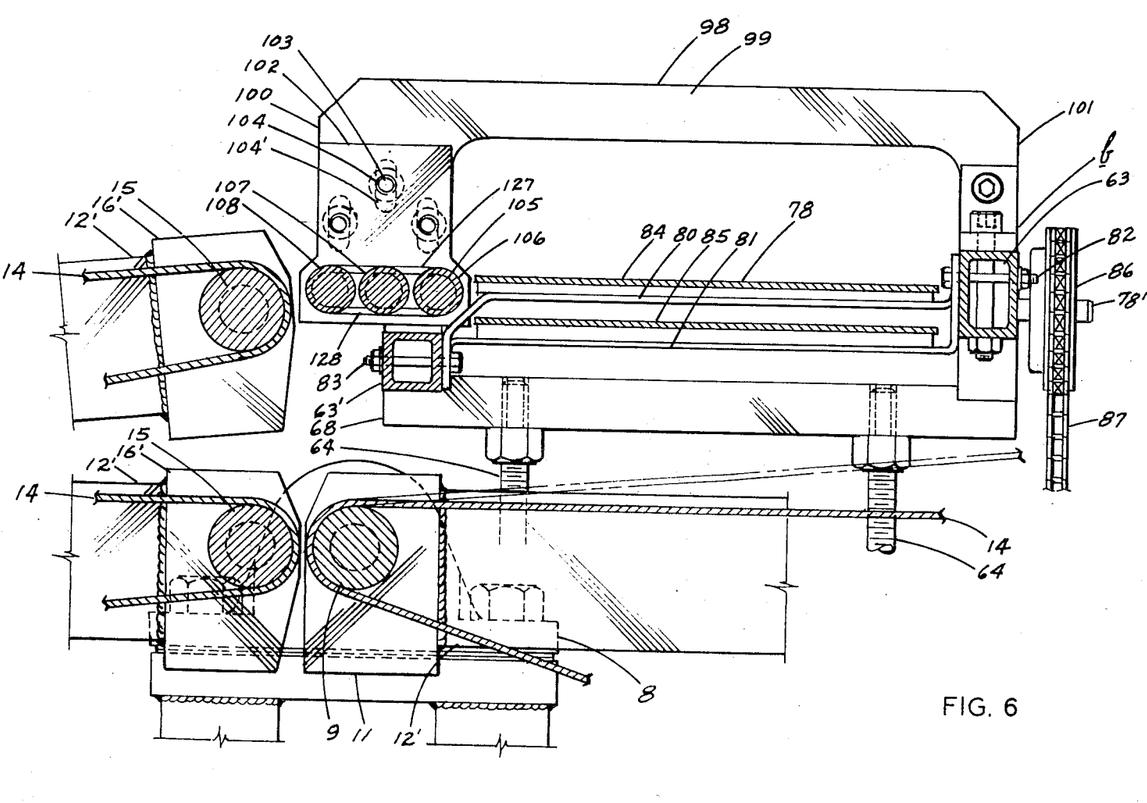
FIG. 6 is an enlarged, fragmentary vertical transverse sectional view taken on the line 6—6 of FIG. 3.

As stated hereinabove, each crossfeed conveyor 4 is disposed overlayingly of the charging end 2 of an infeed conveyor 1 presented forwardly of the infeed conveyor to which the particular crossfeed conveyor relates with each such crossfeed conveyor 4 being operatively connected to the prime mover 29 of the underlying infeed conveyor. Each crossfeed conveyor 4 is, accordingly, adapted for cooperation with the immediately rearward adjacent infeed conveyor 1 and the relative elevation of each crossfeed conveyor 4 above the particular underlying infeed conveyor 1 is determined by the desired clearance for the particular articles being transmitted through conveyor system A so that with adjacent conveyor belts 14 in aligned relationship, the articles may travel beneath crossfeed conveyors 4 and with the related conveyor belt 14 being elevated, articles may be transferred therefrom to the respective crossfeed conveyor 4 in a manner to be described. Each crossfeed conveyor 4 comprises a support frame 62 which includes a pair of elongated, spaced-apart, parallel side members 63, 63', which may be of tubular character and preferably of box cross section (see FIG. 6) for enhancing the sturdiness of frame 62. Said side members 63, 63' extend at their opposite ends laterally beyond the underlying crossfeed conveyor 1 for a support in elevated relationship to the underlying crossfeed conveyor 1 by means of threaded, screw-type uprights 64 which are arranged in pairs at either end of crossfeed conveyor 4 with their lower ends extending through openings 65 in support arms 66, which are integral with support frame 5 and extend outwardly therefrom; there being nuts as at 67 for maintaining said uprights 64 in selected position. At their upper ends each of said uprights 64 are threadedly received within a tapped opening (not shown) provided in cross plates 68 extending between side members 63, 63' in their outer projecting end portions. Thus, by appropriate manipulation of the associated nuts 67, the vertical positioning of upright 64 may be controlled so as to create the desired spacing between infeed conveyor 1 and the overlying crossfeed conveyor 4. At one of their ends, each side member mounts a plate 69, 69' respectively, which have elongated slots 70, 70', respectively, for extension therethrough at its ends of an idler shaft 71. At each of its outer ends, idler shaft 71 is journaled in bearings 72 formed in a block 73 slideably disposed within ways 74, 75; each block 73 carries a longitudinally extending screw 76 which, at its outer end, extends through an opening (not shown) in a flange 77 projecting planarwise normally from each plate 69. A nut 77' is provided for engaging the projecting end of each screw 76 so that the relative disposition of slide block 73 with respect to ways 74, 75 may be adjusted for controlling the tension of an endless conveyor belt 78 which is trained about drive shaft 71 and progresses between side members 63, 63' for engaging an idler shaft 79 at its opposite end, which shaft is journaled in bearings provided in side members 63, 63' at the ends thereof remote from slide blocks 73; said idler shaft 79 being located laterally outwardly of the adjacent side portion of the underlying infeed conveyor 1. Provided between shafts 71 and 79 is a 80, 81, of longitudinally spaced-apart upper and lower belt support plates 80, 81, respectively, which are suitably secured, as by bolts 82, 83, to side members 63, 63'; said plates 80, 81, thus, underlie the upper and lower courses 84, 85, respectively, of conveyor belt 78. One end of drive shaft 71 indicated at 78' projects beyond side member 63 and thereon carries a sprocket 86, about which is engaged the upper portion of a drive chain 87 which, in its lower portion, intermeshes with a sprocket 88 fixed on one end of the shaft 89 of a clutch and brake unit indicated generally 90; there being a sprocket 91 fixed on the opposite end of said shaft 89 for connection to a shaft 92 of a gearbox 93 by means of a chain 94 and sprocket 95 secured on said shaft 92. Gearbox 93 incorporates a driven shaft 96 suitably connected to shaft 92 but axially normal thereto for operative connection with main shaft 22 by means of a drive chain 97 which, in its forward portion, engages a sprocket 98 mounted on said main shaft 22 (FIG. 10). Thus, conveyor belt 78 of crossfeed conveyor 4 is connected to the prime mover of the underlying infeed conveyor so that upon actuation of the latter, said crossfeed belt 78 will be caused to travel in following a path axially perpendicular to the normal path of travel of conveyor belts 4. As will be described more fully hereinbelow, clutch-brake unit 90 will be so controlled as to effect stoppage of conveyor belt 78 at predetermined junctures of operation of conveyor system A. Crossfeed conveyors 4, thus, are adapted to conduct the particular articles to a point laterally of the path of movement of conveyor belts 14 of infeed conveyors 1, such as, for example, for conducting the articles to a particular service station as for inspecting, wrapping, packing, etc. It will be understood that the direction of travel of belt 78 of the various crossfeed conveyors 4 may be toward either side of infeed conveyors 1 as desired so that servicing stations may be alternated or arranged consonant with the available space and requirements of the intended operations.

Bridging each crossfeed conveyor 4 is a pair of U-shaped mounting plates 98, 98' spaced-apart longitudinally of said conveyor 4 with the intervening distance being at least slightly greater than the width of the conveyor belt 14 of the associated infeed conveyor 1. Each mounting plate 98, 98' incorporates a central transverse web 99 and downwardly extending, relatively short forward and rearward legs 100, 101 respectively, which are suitably secured through bolted mounting flanges indicated generally at $f$ to the adjacent side members 63, 63', as the case may be. Said forward legs 100 are of relatively greater width than legs 101 and with their widths being their greater dimension whereby said legs 100 are presented so that their greater dimensions are planarwise normal to the path of travel of conveyor belt 78 and with their mounting flanges $f$ being presented upon their mutually remote faces (see FIG. 7) and with their confronting faces each having suitably secured thereon a bearing plate 102 by means of a plurality of bolts 103 extending through aligned openings 104, 104' provided in bearing plate 102 and legs 100, respectively, with the same being so mutually adapted as to allow for vertical adjustability of bearing plate 102 with respect to the associated leg 100 (see FIGS. 7 and 6).

Each of said bearing plate 102 are provided in their lower end portions with a set of three horizontally aligned bearings as indicated at 105 for supporting the ends of relatively high-speed rollers 106, 107, 108 which are preferably formed of stainless steel, being in side-by-side, axially parallel relationship, with their upper surfaces being aligned and located slightly above the upper course 84 of conveyor belt 78 (see FIG. 6) so as to allow for a facile transfer of articles therefrom onto said conveyor 78 in a manner to be described below. Thus, said rollers 106, 107 and 108 are in immediate relationship to the related conveyor belt 78 and with their longitudinal axes being parallel to the direction of travel of said conveyor belt 78. Engaged about the end portion of roller 106 proximate leg 100 of mounting plate 98 is a pair of short, endless, friction drive belts 109, 109' the opposite end portions of which extend about pulleys 110, 110' carried on one end of a driving shaft 111 which projects freely through aligned openings 112, 113 formed in bearing plate 102 and the leg 100 of the adjacent mounting plate 98; said shaft 111 extends beyond mounting plate 98 for projection through a bore 114 formed in a bearing block 115, the ends of which bore 114 are counterbored as at 116, 117 for receiving bearings 118, 119, respectively, within which said shaft 111 is journaled. Shaft 111 continues beyond bearing 119 for supporting upon its projecting end a pulley 120 about which is trained the upper end portion of an endless drive belt 121, the lower portion of which extends about a pulley 122 fixed upon the end extremity 9' of the immediately below drive shaft 9. Accordingly, the angular velocity of roller 106 is directly related to the speed of rotation of shaft 9 of the immediately below infeed conveyor 1 so that the ratio of the diameters of pulleys 122 and 120 will determine the relative rates of rotation. The bearing block 115 is fixed upon a plate 123 suitably secured to the adjacent side member 63; said plate 123 also supporting in its lower outer portion a relatively smaller bearing block 124 for a stub shaft 125 upon the outer end of which is mounted a guide 126 for belt 121.

Referring now to FIG. 10, it will be seen that roller 106 is drivingly connected to intermediate roller 107 by means of an endless friction belt 127 located at the ends of said rollers proximate web 99 of plate 98'. Similarly, said intermediate roller 107 is drivingly connected to roller 108 by means of a like endless friction belt 128 so that upon roller 106 being driven through shaft 111, rotation will be transmitted to roller 107 and then to roller 108, whereby the said three rollers will be caused to simultaneously rotate at the same rate.

As will be apparent from a review of the drawings, the components of the transmission of the present invention are so related as to cause rollers 106, 107, and 108 to rotate at a relatively increased speed with respect to the speed of rotation of shaft 9 so that a predetermined relationship may be established between the rate of travel of conveyor belt 14 and the rotational speed of said rollers 106, 107, and 108 for purposes presently appearing. Also, as will become evident below, the rate of travel of crossfeed conveyor belt 78 will also have a predetermined relationship to the rate of lineal travel of infeed conveyor belt 14.

The essential operation of the conveyor system of the present invention is as follows: Discrete articles, such as for instance, candy bars, are fed in a relatively random fashion to the first infeed conveyor 1 from the main conveyor (not shown), which is in communication with the source of the articles in question. Pivot frame 13 will be periodically swung upwardly into the position shown in phantom lines in FIG. 2 for delivering articles onto the rotating rollers 106, 107, 108. As the speed of same is relatively greater, the articles deposited thereon will be brought into alignment transversely of the system and in such state transmitted to the adjacent crossfeed conveyor 78, which at such particular juncture is stationary. Upon receipt of said articles, the said crossfeed conveyor 78 will then be actuated for conveying said articles, in such aligned condition, to a point laterally of the main line of travel of system A as to a station for wrapping, packaging, inspecting, or the like. As will be shown more fully hereinbelow, the upward swinging of pivot frame 13 will be controlled so that articles will not be delivered to said rollers and the adjacent crossfeed conveyor 78, if the latter is momentarily fully supplied; thereby obviating the hazard of jamming and like disruption. Under such conditions, the particular infeed conveyor 1 will be maintained in horizontal or normal condition whereby articles carried thereon may travel onto the next adjacent infeed conveyor 1 for further lineal travel and ultimate deposition upon a crossfeed conveyor 78 which is in a ready state for accepting such articles. It is therefore, contemplated that the conveyor system of the present invention will comprehend a multiplicity of units so that a plurality of laterally located, article-receiving stations may be presented spacedly throughout the system whereby a markedly high volume of the particular articles may be handled in a most expeditious manner since, in effect, if one crossfeed conveyor 78 is in a full, nonaccepting state, the articles will be automatically moved along until the same have reached a crossfeed conveyor 78 which is in an article-accepting condition.

The aligning of the articles as caused by rollers 106, 107, and 108 and the presentation of the same in such state to the proximate, relatively narrow crossfeed conveyor 78 conduces to facile handling of the individual articles for the intended operation at the respective station.

Figure 11:
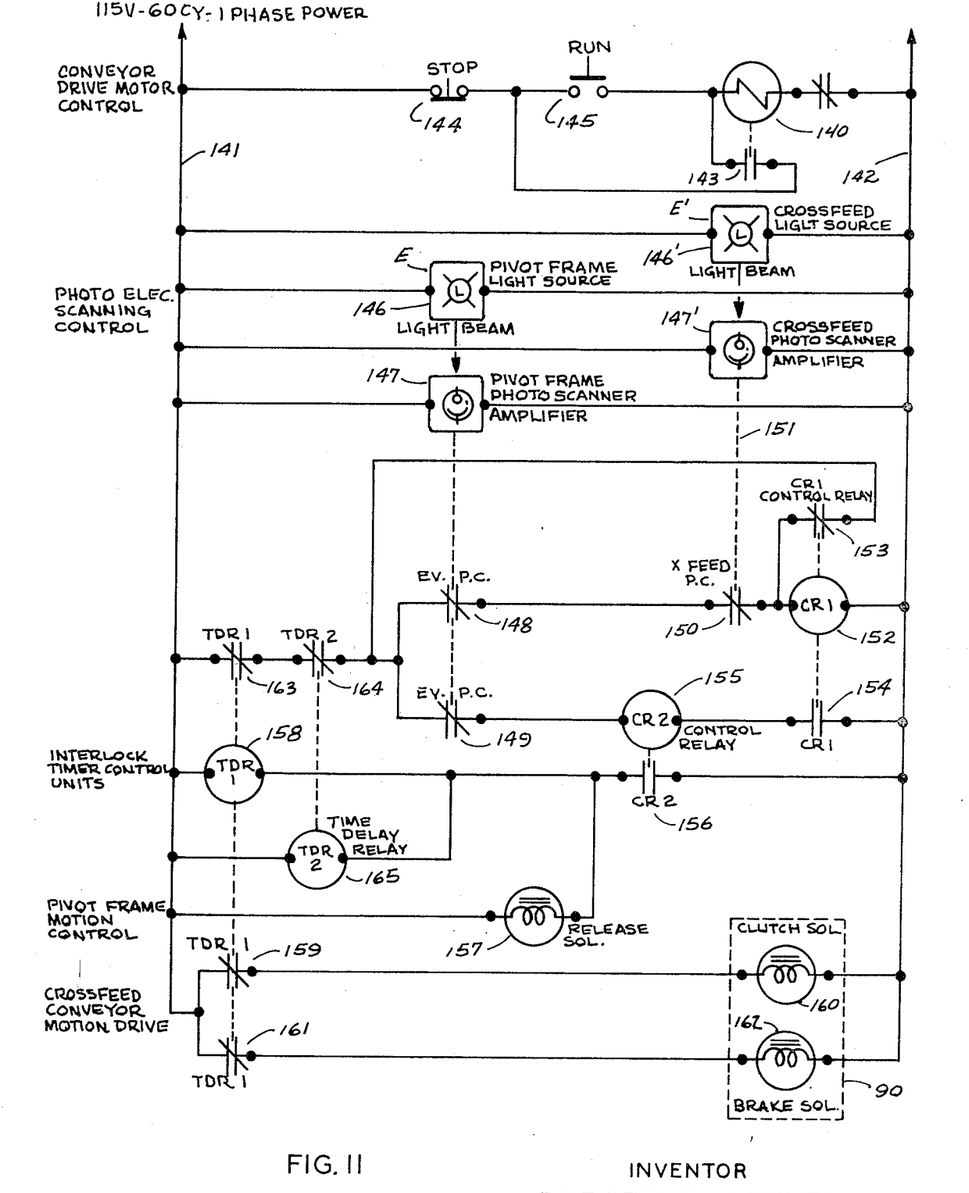
FIG. 11 is a ladder format schematic diagram of the electrical system of the present invention.

With reference to FIG. 11, the operation of the present conveyor system may become more lucid. Said figure constitutes a ladder format schematic diagram which is adopted for descriptive purposes in view of the fact that the present system is partially solid state and since the same will conduce to a greater ease of comprehension. Prime mover 29 (not shown in FIG. 12) is in circuit with a magnetic contactor coil 140 by the main leads 141, 142 which connect the system to a suitable power source. Contactor coil 140 is provided with normally open auxiliary contacts 143 which are connected to a normally closed stop pushbutton switch 144 and a normally open, run pushbutton switch 145. To actuate prime mover 29, switch 145 is closed causing closure of contacts 143 with consequent energization of coil 140. Running will be continued until stop switch 144 is opened by momentary depression thereby cutting off power to contacts 143 which will then open and effect deenergization of coil 140 with cessation of operation of prime mover 29.

To effect appropriate coordination of upward swinging of pivot frame 13 and operation of belt 78 of the related crossfeed conveyor, a pair of photoelectric scanning units indicated generally, E, E' for use respectively within said conveyor belt 14 and crossfeed conveyor belt 78. Each scanning unit E, E' is self-contained, requiring no external amplifier or special power supply with each incorporating a light source module 146, 146' and an amplifier module 147, 147', respectively. The light source modules 146, 146' embody a transformer, lamp, and lens assembly for beaming light across the related conveyor into the associated amplifier module 147, 147', each of which contains a lens assembly, a light-sensitive photocell, amplifier, power supply, and output relay. As may best be seen in FIG. 1, modules 146, 147 of scanning unit E are presented on opposite sides of the related infeed conveyor 1 adjacent the discharge end 3 thereof; while the modules 146', 147' of scanning unit E' are located on opposite sides of the related crossfeed conveyor 4, but immediately proximate the particular handling station. The latter is designed to detect the presence or absence of articles or product, candy bars in the present example, at the discharge end of the related crossfeed conveyor 78 so as to condition the system for upward pivoting of pivot frame 13 consequent to disruption of the light beam from source 146 by virtue of the article or product moving on main conveyor 14. It will thus, be observed that the photoelectric scanning units E, E' are arranged in series. The output relay of amplifier module 147 incorporates first and second pairs of contacts indicated at 148, 149, the former being normally closed; the latter being normally open; while the output relay of amplifier module 147' embodies a pair of normally closed contacts designated 150. Upon operation of said latter relay as suggested by the dotted line 151, contacts 150 are closed to thereby bring about energization of a control relay 152 with resultant closing of its first and second pair of contacts 153, 154, respectively, said latter being in series with a control relay coil 155. It will be observed that the circuit between contacts 150 of the output relay of amplifier 147' and contacts 148 of the output relay of amplifier module 147 is closed. Thus, when the light beam emitted by module 146 is interrupted, contacts 149 of the output relay of amplifier module 147 are closed with consequent energization of control relay 155 whereby the contacts of the latter, as designated at 156, are closed for completing the circuit through the actuating solenoid 157 of the single revolution clutch 57 and causing clutching action by development of rotation of clutch shaft 56 resulting in revolution of camshaft 50 and effecting upward swinging of pivot frame 13 to transmit articles onto high-speed rollers 106, 107, and 108 as above described.

Also connected between control relay contacts 156 and lead 141 is a time delay relay coil 158 having a first pair of normally closed contacts 159 connected to the operating solenoid 160 of the clutch component of unit 90; and a second pair of contacts 161 connected to the operating solenoid 162 of the brake component of said unit 90. Accordingly, upon energization of coil 158 through closure of contacts 156, solenoid 162 will be energized to bring about braking action so that travel of crossfeed conveyor belt 78 will be arrested for a predetermined time interval; being that period during which articles are received thereon from the associated rollers 106, 107, 108. Time delay relay coil 158 also incorporates a third pair of contacts 163, which are normally closed and which are in circuit with the normally closed contacts 164 of a second time delay relay coil 165; said contacts 163 and 164 being connected to contacts 153 of control relay 152. Time delay relay coil 165 is connected to contacts 156 of control relay 155 so that upon closure of said contacts, said coil 165 will be energized.

By means of contacts 163 and 164 the periods of energization of coils 158 and 165, respectively, may be adjusted whereby upon elapsing of the time interval said coils will be deenergized so that through the former, contacts 161 will be opened thereby removing the braking action with resumption of travel by related crossfeed conveyor belt 78. Thus, with respect to coil 158, the selected interval will be determined by the requisite period for transferring articles from the rollers 106, 107, and 108. Time delay relay coil 165 is designed to allow control relays 152 and 155 to return to normal deenergized state preparatory for the next operation initiated through photoelectric scanning unit E'.

In view of the foregoing it will be seen that conveyor system A is adapted to automatically present articles to the lateral handling stations for continuously supplying same with articles to thereby assure high volume, economic and rapid handling. Photoelectric scanning unit E' is so positioned as to initiate the article feeding operation as the momentary supply for the particular lateral station is approaching exhaustion. Thus, with the output relay of said unit E' energizing coil 152 the circuit is then conditioned for closure upon interruption of the light beam from module 146 of photoelectric scanning unit E. In this connection it is to observed that with the nonaligned or random disposition of the articles being moved upon the related infeed conveyor 1 the forwardmost of any such grouping will bring about light interruption which will be continued until all the articles of such nonaligned group have passed by said light. Time delay relay coil 165 remains energized for a preselected interval to prevent premature upward swinging of pivot frame 13 until an adequate number of articles have passed unit E for row formation; it being remembered that such units are in random relationship, upon upward swinging of pivot frame 13 through energization of both control relays 152 and 155 as above-described, the particular crossfeed conveyor 78 is stopped by means of time relay relay 158, but rollers 106, 107, 108 are rotating at a relatively advanced rate so that the articles deposited thereon from the new elevated infeed conveyor belt 14 will be brought into alignment and transferred to the arrested belt 78. The clutching side of clutching and brake unit 90 is then actuated to cause cross conveyor belt 78 to deliver the aligned articles to the adjacent station.

The relative rates of travel of conveyor belts 14 and 78 are critical as well as the relationship of said rates to the speed of rotation of rollers 106, 107, and 108. Although it is recognized that such critical ratios may differ depending upon the character of the articles being conveyed, it has been found that when the present invention is utilized for candy bars, the ratio is as follows: Conveyor belt 14 travels at a speed of approximately three times of that of conveyor 78, while rollers 106, 107, and 108 rotate at an angular velocity of substantially twice the rate of travel of conveyor belt 14. Thus, rollers 106, 107, and 108 rotate at approximately five to six times the rate of lineal travel of conveyor belt 78. The foregoing ratios for candy bars is merely exemplary, since the various speeds will be determined by the character of the articles being handled and the requirements therefor.

Having thus described my invention, what I claim and desire to obtain letters patent for is:

1. For use in a conveyor system for discrete articles, the improvement comprising first conveyor means, second conveyor means disposed in elevated axially perpendicular relationship to said first conveyor means, means for effecting upward swinging of said first conveyor means for communicating with said second conveyor means, a series of rollers presented adjacent said second conveyor means for disposition between said first conveyor means and said second conveyor means when the former is upwardly swung, and means for effecting joint rotation of said rollers at a speed greater than the rates of travel of said first and second conveyor means.

2. For use in a conveyor system for discrete articles, the improvement as defined in claim 1 and further characterized by means for arresting travel of said second conveyor means when articles are being delivered thereto from said rollers.

3. For use in a conveyor system for discrete articles, the improvement as defined in claim 1 and further characterized by said rollers being planarwise aligned in axially parallel relationship with their upper surfaces being substantially aligned with the upper surface of said second conveyor means.

4. For use in a conveyor system for discrete articles, the improvement as defined in claim 3 and further characterized by the extent of upward swinging of said first conveyor means being such as to present the same into immediate adjacency with said rollers for facile transfer of articles to the latter from the former.

5. For use in a conveyor system for discrete articles, the improvement comprising first conveyor means, second conveyor means disposed in elevated, axially perpendicular relationship to said first conveyor means, first article-sensing means provided with said first conveyor means, second article-sensing means provided with said second conveyor means, means operatively connecting said first and second sensing means, and means for effecting upward swinging of said first conveyor means responsive to actuation of said first and second article-sensing means.

6. For use in a conveyor system for discrete articles, the improvement as defined in claim 5 and further characterized by first timing means connected to said second article-sensing means for causing said means for effecting upward swinging of said first conveyor means to operate for a time juncture to allow a predetermined number of articles to move from said first conveyor means to said second conveyor means.

7. For use in a conveyor system for discrete articles, the improvement as defined in claim 5 and further characterized by means for controlling the relative rates of travel of said first and second conveyor means, and timing means connected to said first and second sensing means for effecting cessation of travel of said second conveyor means when said first conveyor means is in communication therewith.

8. For use in a conveyor system for discrete articles, the improvement as defined in claim 5 and further characterized by said first sensing means being a first photoelectric scanning unit presented proximate the end of said second conveyor means remote from said first conveyor means, said second sensing means being a second photoelectric scanning unit located proximate the end of said first conveyor means adjacent said second conveyor means, said means operatively connecting first and second sensing means being circuitry for connecting said first and second photoelectric scanning units in series so that upward swinging of said first conveyor means will not be effected until both said first and second photoelectric scanning units have been actuated.

9. For use in a conveyor system for discrete articles, the improvement as defined in claim 6 and further characterized by second timing means operatively connected to said first and second sensing means for arresting travel of said second conveyor means while said first conveyor means is in communication therewith.

10. For use in a conveyor system for discrete articles comprising a base frame, a pivot frame mounted on said base frame, a first conveyor carried on said pivot frame having an article-receiving end and an article-discharge end, means for causing upward swinging of said pivot frame for elevating the said article-discharge end of said conveyor, a second conveyor disposed upwardly of the article-discharge end of the first conveyor and having an endless belt, said second conveyor being disposed so that its endless belt travels in a direction axially perpendicular to that of said first conveyor, a plurality of rollers disposed adjacent said second conveyor for disposition between same and said first conveyor when the latter is elevated at its article-discharge end, said rollers being planarwise aligned in axially parallel relationship with their upper surfaces being substantially aligned with the upper surface of the endless belt of said second conveyor, and means for effecting upward swinging of said first conveyor pivot frame at predetermined junctures for delivery of discrete articles from said first conveyor to said rollers and thence to said second conveyor.

11. For use in a conveyor system for discrete articles, as defined in claim 10 and further characterized by the extent of upward swinging of said first conveyor pivot frame being such as to present the same into immediate adjacency with said rollers for facile transfer of articles to the latter from the former.

12. For use in a conveyor system for discrete articles, as defined in claim 11 and further characterized by means for arresting travel of said second conveyor while articles are being transferred from said first conveyor onto said rollers and timing means for maintaining said first conveyor in upwardly swung condition to permit transfer to said rollers of a predetermined number of discrete articles which latter are subjected to the relatively increased rate of speed of said rollers for being delivered therefrom onto said arrested second conveyor belt in side by side aligned condition.

13. For use in a conveyor system for discrete articles, the improvement comprising a base frame, a pivot frame mounted thereon, a first conveyor carried on said pivot frame and having an article-receiving end and an article-discharge end, a shaft rotatably mounted upon said base frame, means for driving said shaft, means interengaging said shaft and the article-discharge end of said pivot frame whereby upon rotation of said shaft said pivot frame will be swung upwardly, a second conveyor disposed in elevated axially perpendicular relationship to said first conveyor so that upon operation of said shaft the article-discharge end of said first conveyor will be presented for communication with said second conveyor.

14. For use in a conveyor system for discrete articles, the improvement as defined in claim 13 and further characterized by said means interengaging said shaft and said pivot frame comprising a cam fixed on said shaft, a cam follower provided on said pivot frame for engaging said cam.

15. For use in a conveyor system for discrete articles, the improvement as defined in claim 13 and further characterized by timing means connected to said shaft driving means causing discontinuance of shaft operation for a predetermined interval consequent to upward swinging of said pivot frame.

* * * * *